Jan. 28, 1936. W. WEMHÖNER 2,029,142
CARBURETOR FOR COMBUSTION ENGINES
Filed March 15, 1934
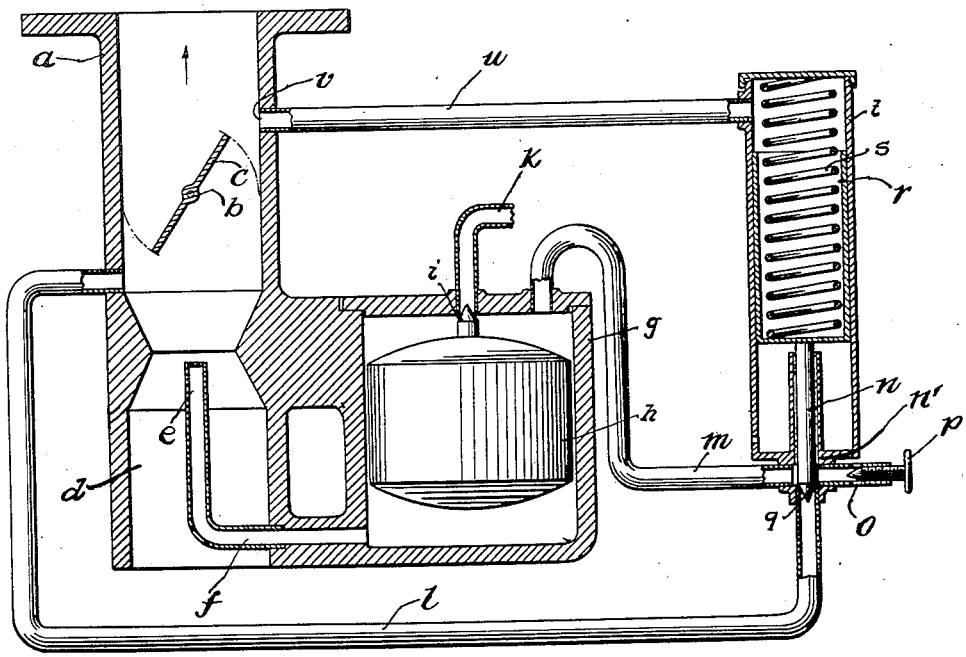
INVENTOR
WILHELM WEMHÖNER
BY
ATTORNEY Patented Jan. 28, 1936

2,029,142

UNITED STATES PATENT OFFICE 2,029,142

CARBURETOR FOR COMBUSTION ENGINES

Wilhelm Wemhöner, Berlin, Germany

Application March 15, 1934, Serial No. 715,769
In Germany March 15, 1933

2 Claims. (Cl. 261—72)

This invention relates to carburetors for internal combustion engines and more particularly to a novel apparatus for maintaining a desired mixture of fuel and air under a wide variety of engine operating and working conditions.

One object of the invention is to provide a novel carburetor construction which shall produce a fuel mixture varying according to engine speed and load conditions and this result is obtained by utilizing the suction pressure in the engine manifold to regulate the pressure differential between the intake mixing chamber and the carburetor fuel float chamber.

Another object of the invention is to provide apparatus of the character designated in which a novel regulator valve mechanism automatically controls the admission of air and fuel to provide the desired combustible mixture at the proper time during certain operating conditions of the engine.

A further object of the invention is to provide a novel form of carburetor which shall be simple in construction and more dependable and economical in operation than similar devices heretofore proposed.

These and other objects of the invention will be more manifest from the following specification and drawing and more particularly set forth in the claims.

In the drawing, there is shown a diagrammatic view, partially in section and elevation, of a carburetor embodying the novel features of my invention. This arrangement employs a suction intake mixing chamber or pipe $a$ connected to the intake manifold of an internal combustion engine (not shown). The intake mixing chamber is provided with a throttle valve $c$ pivotally mounted at $b$ and the mixture of fuel and air passes to the engine manifold as indicated by the arrow.

To the suction pipe $a$ is connected the mixing pipe $d$ in which is arranged the fuel jet $e$, which by means of the conduit $f$ is in connection with the float chamber $g$, containing the float $h$ with the float needle $i$. Into the float chamber $g$ at the top enters the fuel feed pipe $k$. The float chamber is connected to the mixing pipe $d$ by means of a pipe conduit, both sections $l$ and $m$ of which are separated by the needle valve $n$. The part $m$ is constantly in connection with the atmosphere by means of the opening $o$, the cross-section of which is adjusted by the screw $p$. By altering the position of the needle $n$, the pressure differential between the float chamber and the mixing pipe is controlled. If the needle $n$ completely closes the conduit on the point $q$, there is atmospheric pressure in the float chamber as the float chamber is in sole connection with the opening $o$ by means of the conduit $m$. If the needle is completely lifted, the suction pressure existing in the mixing chamber is transferred to the float chamber, as the cross-section of the conduit valved at $q$ is considerably larger than the small outlet $o$ leading to the open air.

The needle valve $n$ is connected to the piston $r$, which is under effect of the spring $s$ tending to keep the needle in closed position. The valve $n$ projects through an opening $n'$ in the bottom of the cylinder so that the piston $r$ will always be subject to the prevailing pressure in the passage $l$, $m$. The piston $r$ slides in the cylinder $t$ which is in connection with the suction pipe $a$ by the conduit $u$. The point $v$, where the conduit joins the suction pipe $a$, is above the throttle $c$; that is between the throttle and the combustion chamber of the engine.

The piston $r$ is lifted by the suction pressure existing between the throttle and combustion chamber of the engine against the spring $s$. Thus the cross-section $q$, which means the pressure differential between float chamber and mixing chamber is regulated according to the underpressure behind the throttle.

The operation of the arrangement is as follows:

Assuming the load of the engine increases and that at the time the throttle-opening is enlarged, while the number of revolutions remains constant. Then the suction pressure on the inlet $v$ of the pipe $u$ decreases and by this the valve $q$ will be lowered a certain amount. Consequently the pressure in the float chamber compared to that of the mixing pipe at the jet nozzle will increase and the fuel discharge will be augmented. Therefore at enlarging load and constant revolutions a richer mixture is obtained. Furthermore, let it be assumed that at the same position of the throttle, the load on the engine diminishes. Then the speed of the engine will increase and draw more air into the intake $a$ and thus a greater suction pressure at the point $v$ will be effected. The increased suction raises the piston $r$ and thus enlarges the valve opening $q$ and by this effects a decrease of pressure in the float chamber, which again results in reducing the fuel discharge out of the jet. Thus at constant throttle position and decreasing load, a comparatively leaner mixture is obtained.

In all other cases of various throttle position, number of revolutions of the engine and load of engine, the valve $q$ thus always is operated in such a manner that feeding with a mixture is performed which suits exactly the various conditions of engine capacity.

I claim:—

1. In a carburetor for internal combustion engines, in combination, a float chamber, a mixture conduit including a venturi, a fuel jet in said venturi, a throttle valve in said conduit posterior to said venturi, a fuel pipe leading from said chamber directly to said jet, a passage leading from a point in said chamber above the fuel level therein to a point in said conduit between said venturi and said throttle, a cylinder, a piston slidable in said cylinder, a valve on said piston adapted to control said passage, a spring in said cylinder urging said valve toward closed position, a second passage from said cylinder behind said piston to a point in said conduit beyond said throttle, and adjustable means to admit air to said first passage between said valve and said chamber.

2. In a carburetor for internal combustion engines, in combination, a float chamber, a mixture conduit including a venturi, a fuel jet in said venturi, a throttle valve in said conduit posterior to said venturi, a fuel pipe from said chamber directly to said jet, a passage leading from a point in said chamber above the fuel level therein to a point in said conduit between said venturi and said throttle, a cylinder, a piston slidable in said cylinder, a valve on said piston adapted to control said passage, a spring in said cylinder urging said valve toward closed position, a second passage from said cylinder behind said piston to a point in said conduit beyond said throttle, and adjustable means to admit air to said first passage between said valve and said chamber, said first passage having an opening into said cylinder in front of said piston.

WILHELM WEMHÖNER.